(12) United States Patent
Chopard et al.

(10) Patent No.: US 8,818,435 B2
(45) Date of Patent: Aug. 26, 2014

(54) SYSTEM FOR RECEIVING SATELLITE SIGNALS

(71) Applicant: Thales, Neuilly sur Seine (FR)

(72) Inventors: Vincent Chopard, Tournon sur Rhone (FR); Franck Letestu, Bourg-de-Peage (FR); Bruno Montagne, Saint-Barthelemy de Vals (FR)

(73) Assignee: Thales, Neuilly-sur-Seine (FR)

( * ) Notice: Subject to any disclaimer, the term of this patent is extended or adjusted under 35 U.S.C. 154(b) by 0 days.

(21) Appl. No.: 13/714,103

(22) Filed: Dec. 13, 2012

(65) Prior Publication Data

US 2013/0157606 A1    Jun. 20, 2013

(30) Foreign Application Priority Data

Dec. 16, 2011    (FR) ...................... 11 03884

(51) Int. Cl.
*H04B 7/01* (2006.01)
*G01S 19/21* (2010.01)
*H04B 1/10* (2006.01)

(52) U.S. Cl.
CPC .. *H04B 1/10* (2013.01); *G01S 19/21* (2013.01)
USPC .............. 455/501; 455/296; 455/1; 455/63.1

(58) Field of Classification Search
CPC .......... H04B 1/06; H04B 1/10; H04B 1/1027; H04B 1/1036; G01S 19/21
USPC ........................ 455/1, 501, 63.1, 114.1, 296
See application file for complete search history.

(56) References Cited

U.S. PATENT DOCUMENTS

| 6,885,338 | B2 * | 4/2005 | Gaus et al. ..................... 342/377 |
| 7,630,344 | B1 * | 12/2009 | Kilfoyle et al. ............... 370/334 |
| 2002/0122002 | A1 * | 9/2002 | Maalouf et al. .......... 342/357.12 |
| 2005/0042998 | A1 | 2/2005 | Renard |

OTHER PUBLICATIONS

Institute National De La Propriete Industrielle; Preliminary Search Report; Sep. 19, 2012; Journal Officiel de l'Office europeen des brevets; No. 12/82; France.

Zhang Yi et al.; Improved MWF Algorithm Applied in Space Time Interference Suppression; Signal Processing, Communications and Computing (ICSPCC); 2011 IEEE International Conference; Sep. 14, 2011; pp. 1-4.

(Continued)

*Primary Examiner* — Tuan Pham
(74) *Attorney, Agent, or Firm* — Michael J. Donohue; Davis Wright Tremaine LLP

(57) ABSTRACT

System for receiving satellite signals jammed by at least one source of interference and by a thermal noise comprising means for receiving the said satellite signals, means for filtering the said satellite signals, in order to remove the disruption from the said sources of interference. The system also comprises first means for determining a first covariance matrix of the satellite signals, adding means for adding respectively a first coefficient to at least one element of the diagonal of the said first covariance matrix in order to obtain a second covariance matrix, second means for determining, on the basis of the said second covariance matrix, second coefficients used by the said filtering means. The system also comprises means for detecting a first power of the said thermal noise, third means for dynamic determination of the value of the said first coefficients, on the basis of the first power.

8 Claims, 1 Drawing Sheet

(56) References Cited

OTHER PUBLICATIONS

Zhuang X. et al.; Reduced Rank Space-Time Processing for Anti-Jamming GPS Receivers; Tsinghua Science and Technology; Apr. 1, 2009; vol. 4, No. 2; pp. 189-195; Beijing, China.

Zhao Hongwei et al.; Interference Suppression in GNSS Receiver Using Space-Time Adaptive Processing; Communication Software and Networks (ICCSN); 2011 IEEE #rd International Conference; May 27, 2011; pp. 381-385.

Philip Ward; What's Going On? RFI Situational Awareness in GNSS Receivers; Extrait de l'Internet—http://www.insidegnss.com/auto/SepOct07-Ward-RFI[1].pdf; Sep. 10, 2012.

Franck Letestu; Space-Time Adaptive Processing for Navigation; Radar Symposium (IRS); 2011 Proceedings International; Sep. 7, 2011; pp. 769-773.

* cited by examiner

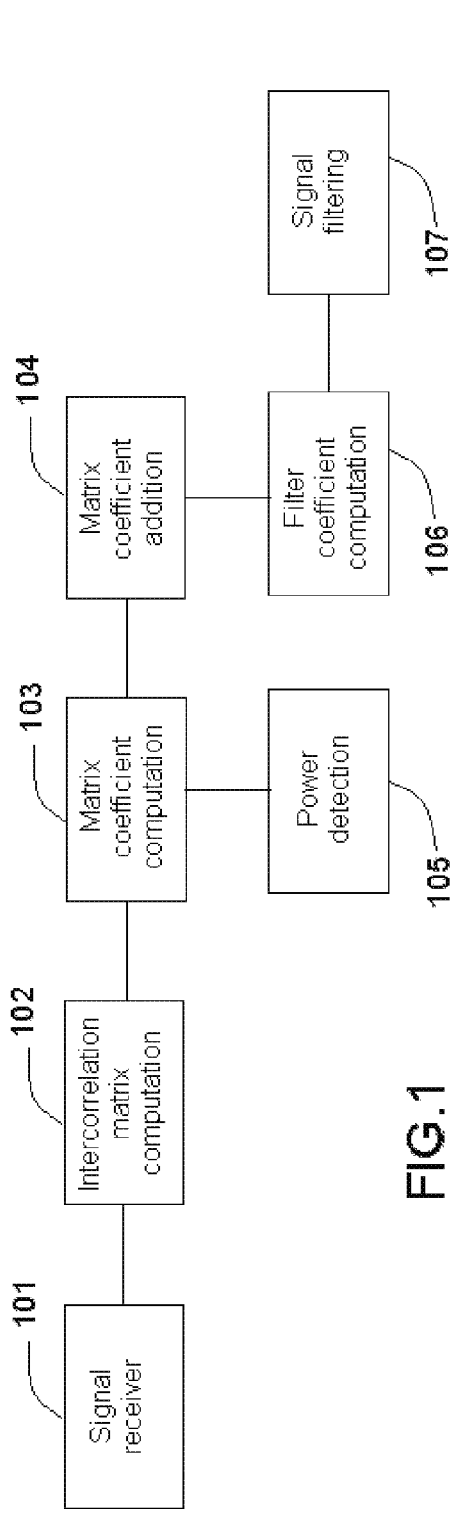
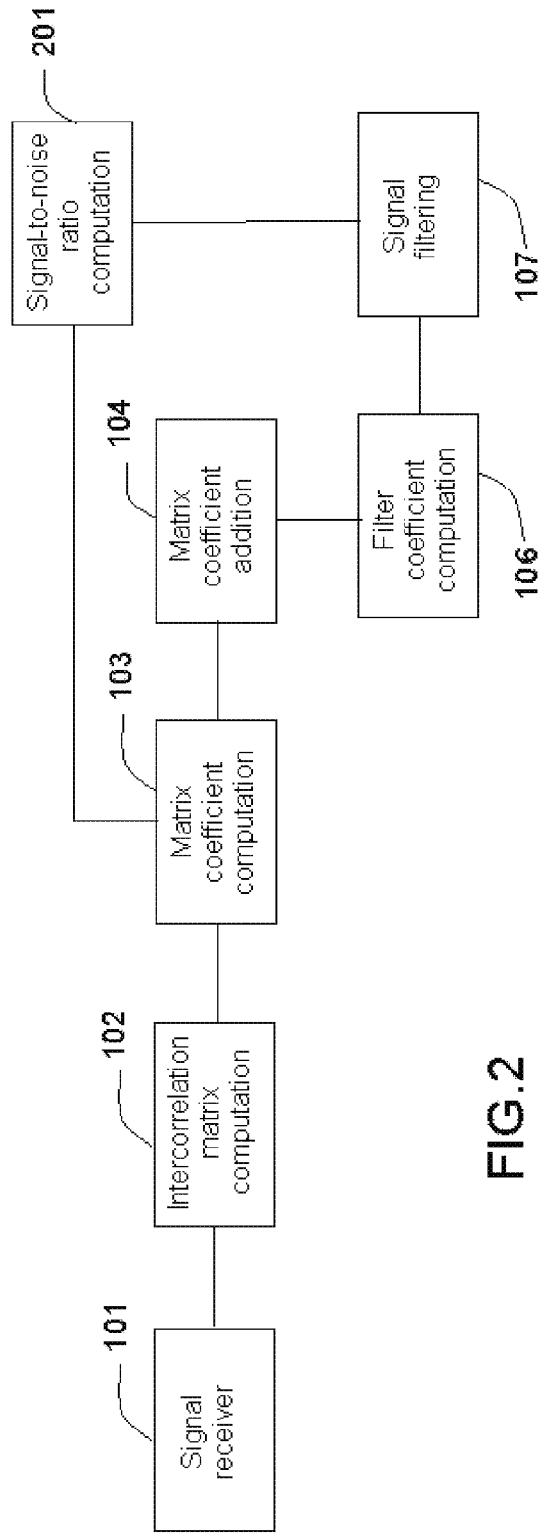

SYSTEM FOR RECEIVING SATELLITE SIGNALS

FIELD OF THE INVENTION

The present invention relates to a device for receiving satellite signals using a set of receivers. These signals can be jammed by the presence of at least one source of interference and by the thermal noise that is present in the components of the reception chains. The present invention makes it possible to improve the reception of the said satellite signals by removing in particular the influence of the sources of interference. It may in particular be used in applications of position, navigation and timing.

BACKGROUND OF THE INVENTION

It is known practice, for receiving these signals, while removing the influence of the sources of interference, to compute an covariance matrix of the received signals and then to determine, by using space-time adaptive algorithms, the coefficient values of finite impulse response filters making it possible to remove the influences of the sources of interference. This determination of the coefficients is carried out on the basis of the covariance matrix. In order to improve the conditioning of the computation of these various coefficients, it is known practice to add to the diagonal of the covariance matrix one or more constant coefficients, respectively associated with each element of the diagonal. However, these constant coefficients do not allow an adaptation to the environmental conditions of the system and to the evolution of the various constraints of the system. In particular, there is no adaptation either to the power of the thermal noise or to the power of the sources of interference. The known solution does not provide optimal performance because it does not allow adaptation to the various conditions of reception of the satellite signals.

SUMMARY OF THE INVENTION

The object of the present invention is notably to remedy this problem by proposing a system for receiving satellite signals that can be adapted to the various parameters of the environment and of the constraints of the system.

Thus, according to one aspect of the invention, a system is proposed for receiving satellite signals jammed by at least one source of interference and by a thermal noise comprising means for receiving the said satellite signals, means for filtering the said satellite signals, in order to remove the disruption from the said sources of interference, and first means for determining a first covariance matrix of the satellite signals. The system also comprises adding means for adding respectively a first coefficient to at least one element of the diagonal of the said first covariance matrix in order to obtain a second covariance matrix, and second means for determining, on the basis of the said second covariance matrix, second coefficients used by the said filtering means. The system also comprises means for detecting a first power of the said thermal noise, third means for dynamic determination of the value of the said first coefficients, on the basis of a first power of the said thermal noise.

This system therefore provides the advantage of being able to filter the received satellite signals in order to optimize the reception of these signals by removing the influence of sources of interference, all this by adapting to the conditions of use of the system, in particular the power of the thermal noise.

The covariance matrix is defined by the following relations in which it is considered, as a non-limiting example, that the covariance matrix is defined over P temporal coefficients and that the system comprises N receivers:

$x_k(t)$ represents the temporal signal sampled at the output of the receiver k at the moment t.

The vector $X_k(t)=[x_k(t) \ldots x_k(t+P-1)]$ represents P samples of the signal $x_k(t)$.

$X(t)=[X_1(t)^T X_2(t)^T \ldots X_N(t)^T]^T$ represents the concatenation of the vectors of P samples originating from N receivers, the size of the vector is therefore NP.

The said covariance matrix Rxx of size (NP)×(NP) is therefore equal to:

$$R_{xx}=E(X(t)X(t)^H)$$

In these relations $^H$ represents the Hermitian operator and $^T$ represents the transposed operator.

According to one embodiment, the detection means are adapted to detect a second power of all the sources of interference. Moreover, the said detection means are adapted to use an automatic gain control device or the said first covariance matrix. The said third determination means are adapted to determine the said first coefficients on the basis of the said first power, of the said second power, of a desired nulling level and of a power threshold of the sources of interference.

According to one embodiment, the said third determination means comprise means for comparing the said second power with the said threshold and comprise computing means adapted to compute the said first coefficients by the following relations:

$$\begin{cases} C(i,j) = P_{int}(i) - P_{noise}(i) & \text{if } P_{int}(i) \leq S \text{ and } P_{signal}(i,j) < P_{noise}(i) \\ C(i,j) = P_{noise}(i) & \text{if } P_{int}(i) > S \text{ and } P_{signal}(i,j) < P_{noise}(i) \\ C(i,j) = P_{signal}(i,j) & \text{if } P_{signal}(i,j) \geq P_{noise}(i) \end{cases}$$

in which C(i,j) represents the first coefficient to be added to the element of the diagonal corresponding to the receiver i and to the sample j of the said first matrix, $P_{noise}(i)$ represents the thermal noise of the receiver i, $P_{int}(i)$ represents the power of the interference received by the receiver i, S represents the said threshold and $P_{signal}(i,j)$ represents the power of the signal corresponding to the receiver i and to the sample j.

By again taking the terminology used to define the covariance matrix, the coefficient C(i,j) is to be added to the element ((i−1)P+j,(i−1)P+j) of the covariance matrix.

According to one embodiment, the said third determination means comprise a computation means adapted to compute the said first coefficients by the following relation:

$$C(i,j)=P_{noise}(i)+\Delta_{capping}(R_{max},i)$$

in which C(i,j) represents the first coefficient to be added to the element of the diagonal corresponding to the receiver i and to the sample j of the said first matrix, $P_{noise}(i)$ represents the thermal noise of the receiver i, $R_{max}$ the determined maximum level of nulling for which the nulling must be made by the system and $\Delta_{capping}(R_{max},i)$ is obtained by the following relations:

$$\Delta_{capping}(R_{max},i)=0 \text{ if } P_{int}(i)-P_{noise}(i)<R_{max}$$

$$\Delta_{capping}(R_{max},i)=R_{max}-(P_{int}(i)-P_{noise}(i)) \text{ if } P_{int}(i)-P_{noise}(i) \geq R_{max}$$

in which $P_{int}(i)$ represents the power of the interference received by the receiver i.

According to one embodiment, the said determined maximum level of nulling $R_{max}$ is substantially zero.

These four technical characteristics make it possible to adapt the first coefficients to be added to the first covariance matrix, to the set of primordial environment parameters affecting the reception performance of the said system. They also allow the clipping and the deactivation of the system.

According to one embodiment, the said third determination means are adapted to determine the said first coefficients by maximizing the ratio between the powers of the signals filtered by the said filtering means and the power of the said thermal noise.

According to one embodiment, the said third determination means comprise correlation means for correlating the said filtered signals and the said satellite signals.

According to one embodiment, the said third determination means comprise correlation means for correlating the said filtered signals and estimated satellite signals representative of the received satellite signals.

These three technical characteristics make it possible to adapt the first coefficients to be added to the elements of the diagonal of the first covariance matrix in order to maximize the ratio between the power of the filtered signal and the power of the thermal noise.

BRIEF DESCRIPTION OF THE DRAWINGS

The invention will be better understood and other advantages will appear on reading the detailed description made as a non-limiting example and with the aid of the figures amongst which:

FIG. 1 shows a first embodiment of the system according to one aspect of the invention.

FIG. 2 shows a second embodiment of the system according to one aspect of the invention.

DETAILED DESCRIPTION OF THE DRAWINGS

The system as shown in FIG. 1 comprises one or more receivers 101 in charge of receiving the satellite signals. On the basis of these satellite signals, originating from the various receivers, a device 102 computes the first covariance matrix of the received signals. In order to improve the conditioning of the said first matrix and hence to make the subsequent computations easier, a first coefficient is added to all or some of the elements of the diagonal of the first matrix. The computation of this or of these first coefficients is carried out by the device 103 and the addition by the device 104.

The computation of the first coefficients is carried out by the device 103 on the basis of the power of the thermal noise that is present on the various receivers and of the power of the interference signals. The computation of these powers is carried out by the power detection device 105. The value of the power of the thermal noise and of the sources of interference may be computed by using the first covariance matrix (without the first coefficients added to the diagonal) or by using the automatic gain controllers included in the signal receivers 101.

If the first covariance matrix is used, a computation method is based on the identification of the specific values representing the thermal noise and the sources of interference (in this case, the device 105 is linked to the device 102). Various conventional methods of separating the sub-spaces of noise (thermal and sources of interference) and of signal can be used, for example the AIC (Aikaike Information Criterion) criterion. On the basis of the specific values of the signal sub-space, it is possible to compute the power of the sources of interference. Then, on the basis of the specific values of the noise sub-space and of the number of estimation points of the first covariance matrix (this number of points is known), it is possible to estimate the variance of the specific values of the noise (which follows a Wishart law) and hence to deduce therefrom an estimate of the power of the thermal noise. These methods do not require calibration but require considerable computing power.

If automatic gain controllers are used, it is necessary to calibrate the automatic gain control command (in this case, the device 105 is linked to the device 101). This calibration can be carried out when the equipment is started up. Then, it is possible to estimate directly the power of the sources of interference and the power of the thermal noise. This calibration is ideally carried out by being isolated from the outside environment, for example by using switches between the output of each antenna and the set of reception elements situated downstream. For the situation in which this isolation is not feasible or is too weak, the calibration may nevertheless be carried out in a controlled environment (factory, in preparation for a mission, etc.). The document entitled "What's Going On? RFI Situational Awareness in GNSS Receivers" by Phillip W. Ward, published in the September/October 2007 number of the review "INSIDE GNSS" provides further details on the use of the automatic gain controllers to determine the power of the thermal noise and of the interference.

The relations used to compute the first coefficient applied to an element of the diagonal of the first covariance matrix are as follows:

$$\begin{cases} C(i,j) = P_{int}(i) - P_{noise}(i) & \text{if } P_{int}(i) \leq S \text{ and } P_{signal}(i,j) < P_{noise}(i) \\ C(i,j) = P_{noise}(i) & \text{if } P_{int}(i) > S \text{ and } P_{signal}(i,j) < P_{noise}(i) \\ C(i,j) = P_{signal}(i,j) & \text{if } P_{signal}(i,j) \geq P_{noise}(i) \end{cases}$$

in which $C(i,j)$ represents the first coefficient to be added to the element of the diagonal corresponding to the receiver i and to the sample j of the said first matrix, $P_{noise}(i)$ (represents the thermal noise of the receiver i, $P_{int}(i)$ represents the power of the interference received by the receiver i, S represents the said threshold and $P_{signal}(i,j)$ represents the power of the signal corresponding to the receiver i and to the sample j.

Usually the level of the threshold S is equal to the thermal noise. Therefore the transition of the weak interference to strong interference method is carried out when the power of the sources of interference exceeds the power of the thermal noise.

These relations make it possible to reduce the noise level in the covariance matrix in order to cause the weak interference to appear. Moreover, if the system must be capped at a performance level defined by a maximum nulling level, $(R_{max})$, which corresponds to the power loss of the interference between the input and the output of the filtering device 107, which this system should allow, the first coefficients applied to the diagonal of the first covariance matrix follow the following relation:

$$C(i,j) = P_{noise}(i) + \Delta_{capping}(R_{max}, i)$$

in which $C(i,j)$ represents the first coefficient to be added to the element of the diagonal corresponding to the receiver i and to the sample j of the said first matrix, $P_{noise}(i)$ represents the thermal noise of the receiver i, $R_{max}$ the determined maximum level of nulling for which the nulling must be made by the system and $\Delta_{capping}(R_{max}, i)$ is obtained by the following relations:

$$\Delta_{capping}(R_{max}, i) = 0 \text{ if } P_{int}(i) - P_{noise}(i) < R_{max}$$

$$\Delta_{capping}(R_{max},i)=R_{max}-(P_{int}(i)-P_{noise}(i)) \text{ if } P_{int}(i)-P_{noise}(i) \geq R_{max}$$

in which $P_{int}(i)$ represents the power of the interference received by the receiver i.

It is also possible for the determined maximum level of nulling $R_{max}$ to be zero in order to cause a deactivation of the system.

A device 106 using a temporal processing algorithm then makes it possible to compute the second coefficients of the finite impulse response filters used to remove the influence of the sources of interference on the satellite signals. The vector of the second coefficients of the filters can be computed by using the following formula:

$$w=\alpha R^{-1}c$$

In this formula $\alpha$ represents the normalization coefficient usually equal to $1/c^H R^{-1}c$. c represents the chosen temporal constraint and R the second covariance matrix. $^H$ represents the Hermitian operator and $^{-1}$ the matrix inversion.

Finally, the finite impulse response filters 107 are applied by using the preceding second coefficients in order to remove the influence of the sources of interference on the satellite signals.

FIG. 2 shows a variant of the system of FIG. 1. The system comprises the set of devices of the first embodiment shown in FIG. 1. Moreover, in this embodiment, a device 201 is used to compute the ratio between the power of the filtered signals and the power of the thermal noise. The device 103 carries out the computation of the first coefficients to be added to the diagonal of the first covariance matrix so as to maximize the value of the signal-to-noise ratio. The computation of the first coefficient(s) is carried out on the basis of the signal-to-noise ratio obtained by using the said first coefficients then by retroaction on the said first coefficients. Several optimization methods are possible, for example iterative methods like the method of the stochastic gradient (known as the Least Mean Square, Recursive Least Square, steepest descent, etc.).

It is possible to improve the accuracy of the computation of the signal-to-noise ratio by carrying out one of the following two operations:

Reconstructing in the system the satellite signals that should be received by the system, correlating these reconstructed signals with the filtered signals and finally computing the signal-to-noise ratio of this correlation.

Correlating the filtered signals with a copy of the signals originating from the various receivers and computing the signal-to-noise ratio of this correlation.

It is also possible to use a device external to the system to compute the signal-to-noise ratio of the filtered signals and to reintegrate this computed value into the device 103 for computing first coefficients.

The invention claimed is:

1. System for receiving satellite signals jammed by at least one source of interference and by a thermal noise comprising:
    means for receiving the satellite signals,
    means for filtering the satellite signals, in order to remove the disruption from the sources of interference,
    first means for determining a first covariance matrix of the satellite signals,
    adding means for adding respectively a first coefficient to at least one element of the diagonal of said first covariance matrix in order to obtain a second covariance matrix,
    second means for determining, on the basis of said second covariance matrix, second coefficients used by said filtering means,
    wherein it also comprises
    means for detecting a first power of the thermal noise,
    third means for dynamic determination of the value of said first coefficients, on the basis of the first power.

2. System according to claim 1, in which said detection means are adapted to detect a second power of all the sources of interference, said detection means being adapted to use an automatic gain control device or said first covariance matrix, said third determination means being adapted to determine said first coefficients on the basis of said first power, of said second power, of a desired nulling level and of a power threshold of the sources of interference.

3. System according to claim 2, in which said third determination means comprises means for comparing said second power with said threshold and comprise computing means adapted to compute said first coefficients by the following relations:

$$\begin{cases} C(i,j) = P_{int}(i) - P_{noise}(i) & \text{if } P_{int}(i) \leq S \text{ and } P_{signal}(i,j) < P_{noise}(i) \\ C(i,j) = P_{noise}(i) & \text{if } P_{int}(i) > S \text{ and } P_{signal}(i,j) < P_{noise}(i) \\ C(i,j) = P_{signal}(i,j) & \text{if } P_{signal}(i,j) \geq P_{noise}(i) \end{cases}$$

in which C(i,j) represents the first coefficient to be added to the element of the diagonal corresponding to a receiver i of said receiving means and to the sample j of the said first matrix, $P_{noise}(i)$ represents the thermal noise of the receiver i, $P_{int}(i)$ represents the power of the interference received by the receiver i, S represents the said threshold and $P_{signal}(i,j)$ represents the power of the signal corresponding to the receiver i and to the sample j.

4. System according to claim 2, in which said third determination means comprises a computation means adapted to compute said first coefficients by the following relation:

$$C(i,j)=P_{noise}(i)+\Delta_{capping}(R_{max},i)$$

in which C(i,j) represents the first coefficient to be added to the element of the diagonal corresponding to a receiver i of said receiving means and to the sample j of said first matrix, $P_{noise}(i)$ represents the thermal noise of the receiver i, $R_{max}$ the determined maximum level of nulling for which the nulling must be made by the system and $\Delta_{capping}(R_{max},i)$ is obtained by the following relations:

$$\Delta_{capping}(R_{max},i)=0 \text{ if } P_{int}(i)-P_{noise}(i)<R_{max}$$

$$\Delta_{capping}(R_{max},i)=R_{max}-(P_{int}(i)-P_{noise}(i)) \text{ if } P_{int}(i)-P_{noise}(i)\geq R_{max}$$

in which $P_{int}(i)$ represents the power of the interference received by the receiver i.

5. System according to claim 4, in which said determined maximum level of nulling $R_{max}$ is substantially zero.

6. System according to claim 1, in which said third determination means are adapted to determine said first coefficients by maximizing a ratio of the powers between said filtered signals and the thermal noise.

7. System according to claim 6, in which said third determination means comprise correlation means for correlating said filtered signals and the satellite signals.

8. System according to claim 6, in which said third determination means comprise correlation means for correlating said filtered signals and estimated satellite signals representative of the received satellite signals.

* * * * *